Feb. 19, 1952  E. E. SHELDON  2,586,392
MOTION-PICTURE CAMERA FOR X-RAY IMAGES
Filed Dec. 9, 1948  3 Sheets-Sheet 1
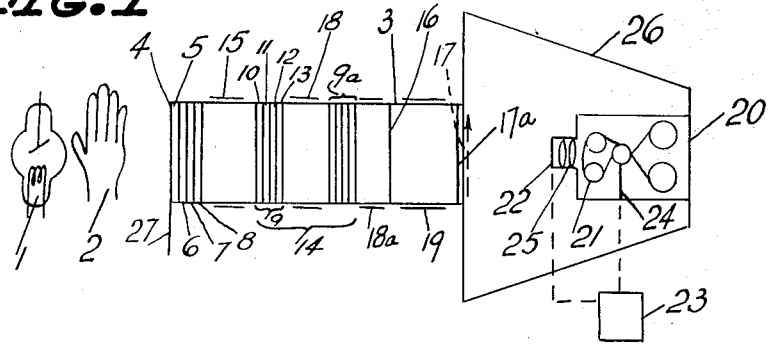
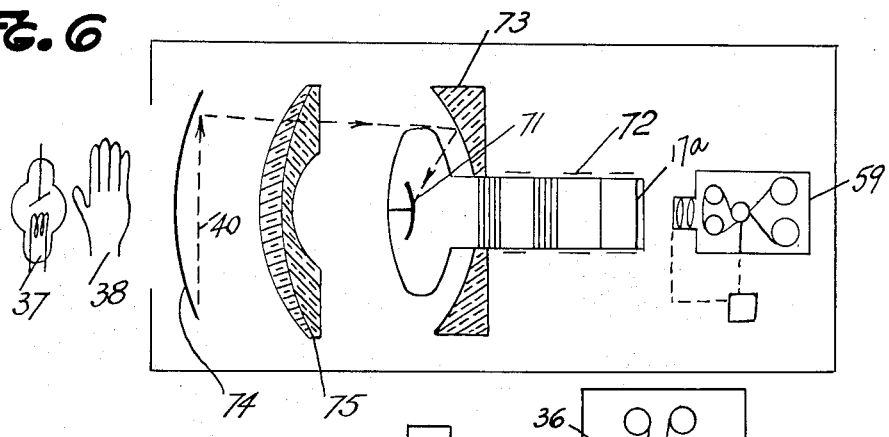
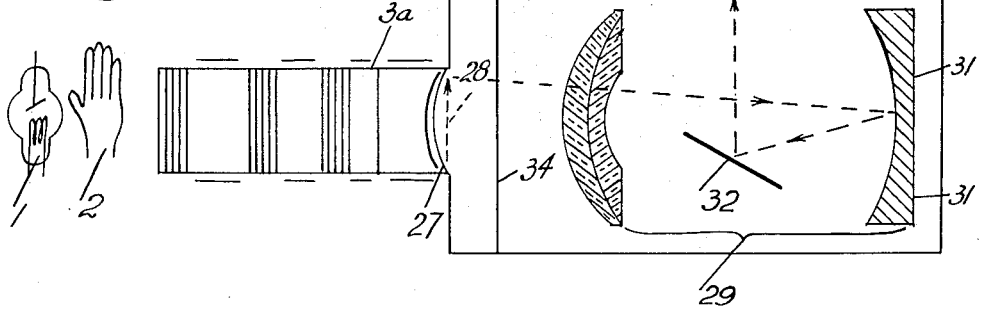
INVENTOR.
EDWARD EMANUEL SHELDON
BY
ATTORNEY Feb. 19, 1952 E. E. SHELDON 2,586,392
MOTION-PICTURE CAMERA FOR X-RAY IMAGES
Filed Dec. 9, 1948 3 Sheets-Sheet 2
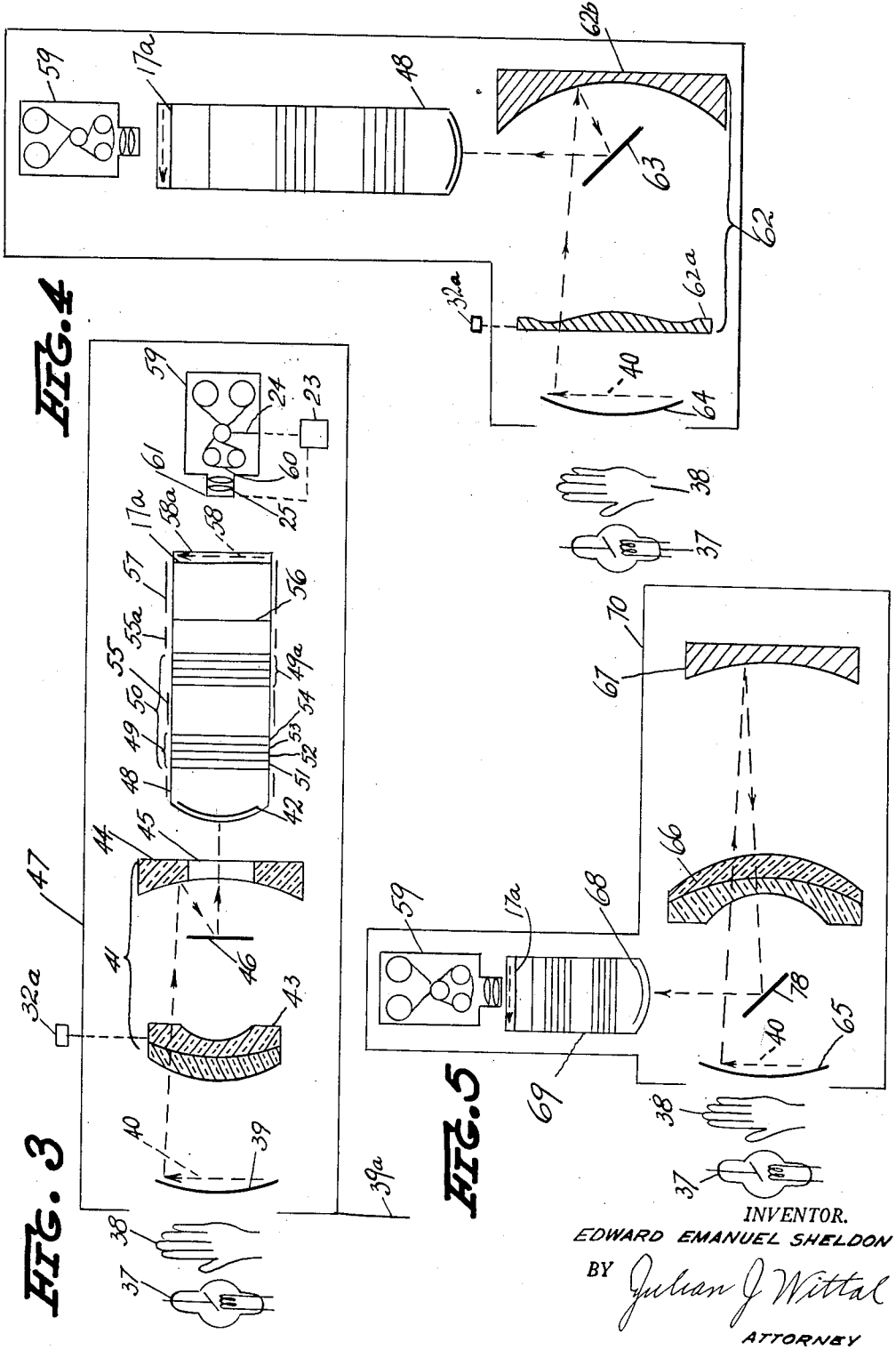
INVENTOR.
EDWARD EMANUEL SHELDON
BY Julian J. Wittal
ATTORNEY Feb. 19, 1952 E. E. SHELDON 2,586,392
MOTION-PICTURE CAMERA FOR X-RAY IMAGES
Filed Dec. 9, 1948 3 Sheets-Sheet 3

INVENTOR.
EDWARD EMANUEL SHELDON
BY Julian J. Wittal
ATTORNEY

Patented Feb. 19, 1952

2,586,392

UNITED STATES PATENT OFFICE 2,586,392

MOTION-PICTURE CAMERA FOR X-RAY IMAGES

Edward Emanuel Sheldon, New York, N. Y.

Application December 9, 1948, Serial No. 64,329

5 Claims. (Cl. 250—65)

My invention relates to the method and device for producing X-ray moving pictures. The importance of cinematographic X-ray pictures to study the organs in health and disease was recognized long ago. Lately the value of X-ray moving pictures gained understanding in industry in examination of moving parts of machinery. In spite of obvious advantages of this method no progress was made because the X-ray energy available after the passage through the body was not sufficient to expose the moving film. To use a source of X-rays of greater energy was not compatible with the patient's safety. The dose of X-rays which would be sufficient for filming purposes would produce burns of skin and severe injury to the blood-forming system of the patient. This was the reason why all X-ray motion picture apparatuses known at present such as of J. Jany, U. S. Patent No. 2,205,853 or described by R. J. Reynolds in British Journal of Radiology, 1934, pages 415-424 or by Stewart, W. H. in American Journal of Roentgenology and Radium Therapy, 1937, vol. 38, pages 465-469, failed in their application. The development of more sensitive film emulsion could not remedy this situation as, filming requires 15-24 frames/second which is equivalent to taking 15-24 X-ray pictures in one second. On the other hand it is well known in the art that 30-40 X-ray pictures of the same region, which would represent only 2 seconds of cinematographic exposure, represents the limit of safe X-ray application.

It is therefore the purpose of my invention to overcome these drawbacks and to shorten the time of the exposure to such a degree that X-ray moving pictures should be of no hazard to the patient.

Another purpose of this invention is to reduce X-ray energy necessary for producing X-ray moving pictures in order to eliminate the need for expensive and bulky multi-million volt X-ray equipment necessary for industrial cinematographic studies.

Another objective of my invention is to provide X-ray motion pictures of better detail and of greater contrast than it was possible until now.

The purposes of my invention were accomplished by the use in combination of X-ray source, of X-ray image intensifying tube, application Ser. No. 741,803, now Patent #2,555,423, of optical system, of shutter system and of moving pictures camera. The invisible X-ray images of the examined body are projected onto X-ray intensifying tube in which they are converted into photoelectron images having the pattern corresponding to X-ray images. The photoelectron images after intensification by cascade amplification, by electronic diminution, by storage and by secondary emission are reconverted into fluorescent images having the pattern of original X-ray images but of few thousand times greater intensity. The intensified flourescent X-ray images are projected through the shutter by the optical system onto moving pictures recording camera.

The invention will be better understood when taken in connection with accompanying drawings.

In the drawings:

Fig. 1 represents device for recording X-ray moving pictures.

Fig. 2 represents variety of this invention in which reflective optical system in moving pictures camera is shown.

Fig. 3 represents an alternate form of this invention in which reflective optical system consists of meniscus lens, of concave spherical mirror and of plane mirror and different X-ray image intensifying tube are shown.

Fig. 4 represents another form of this invention in which more compact reflective optical system is shown.

Fig. 5 represents variety of this invention in which a faster reflective optical system is shown.

Fig. 6 represents modification of the intensifying X-ray image pick-up tube having a solid photocathode.

Figure 7:
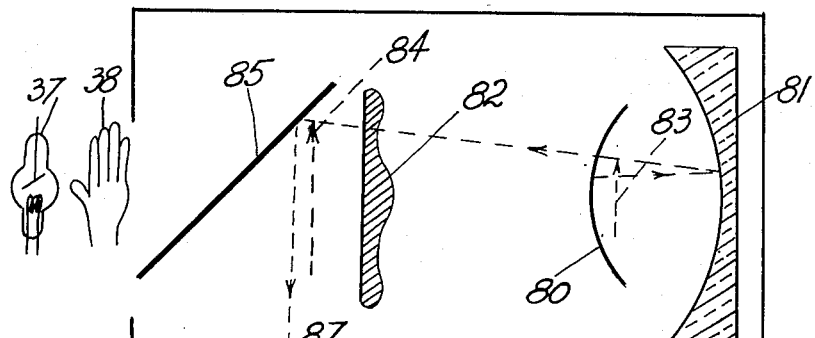
Fig. 7 represents modification of this invention in which X-ray image tube is responsive to an enlarged X-ray image.

Referring to the Fig. 1 there is shown the X-ray source 1, the examined body 2, the X-ray image intensifying tube 3. The face 4, of X-ray intensifying tube must be of a material transparent to the type of radiation to be used. Inside of the face of the tube there is a very thin light reflecting aluminum layer 5 which prevents the loss of light from the X-ray fluorescent screen 6. An extremely thin barrier layer 7 separates the X-ray fluorescent screen 6 from the photoemissive layer 8. The fluorescent 6 and photoemissive layers 8 should be correlated so that there is obtained a maximum output of photoelectrons. Fluorescent substances that may be used are zinc silicates, zinc selenides, zinc sulphide, barium sulphate or calcium tungstate with or without activators. Also inorganic phosphors such as alkaline metals combined with an element belonging to halogens group like NaJ or KJ are very suitable for my invention. Another group of fluorescent substances which may be used for this purpose comprises organic phosphors having benzene ring such as e. g. anthracene, phenanthrene or similar ones. The satisfactory photoemissive materials will be caesium oxide activated by silver, caesium with antimony or with bismuth, or antimony with lithium or potassium. The barrier layer 7 between the X-ray fluorescent and photoemissive surfaces can be an exceedingly thin light transparent film of mica, $ZnF_2$ or silicon or of a suitable plastic.

The photoelectron image obtained and stored in the photoemissive layer 8 is now projected on the first screen 9 of the amplifying section 14 having one 9 or a few successively arranged amplifying screens 9a by means of focusing magnetic and/or electromagnetic fields 15 which are not indicated in detail since they are well known in the art and would only serve to complicate the illustrations.

The amplifying screens 9 and 9a consist of electron pervious light reflecting layer 10, of electron fluorescent layer 11, of light transparent barrier layer 12 and of photo-emissive layer 13. Fluorescent substances that may be used for the amplifying screens 9 and 9a are zinc silicates, zinc sulphide, barium sulphate or NaJ or KJ. Also organic phosphors having benzene ring such as anthracene, phenanthrene can be used. The satisfactory photoemissive materials will be caesium oxide activated by silver, caesium in combination with antimony or with bismuth, or antimony in combination together with lithium or potassium. The barrier layer 12 between the electron fluorescent and photo-emission surfaces can be an exceedingly thin transparent film of mica, $ZnF_2$ or ZnS, silicon or of a suitable plastic. The electron images emitted from the amplifying screen 9 are electron-optically diminished and are focused by means of magnetic or electro-magnetic fields 13 on the next amplifying screen 9a, producing image intensification proportional to the square power of the linear diminution. The electron images from the amplifying section 14 are focused by magnetic or electro-magnetic fields 18a and are projected on the target 16 where they are intensified by secondary emission. The secondary electron image is again diminished electron-optically by magnetic or electron-magnetic lenses 19 and is focused on the fluorescent screen 17 producing intensified fluorescent image having the pattern of the original X-ray images. The screen 17 has backing of a thin layer of aluminum 17a in order to prevent back-scattering of the light.

The intensified fluorescent images appearing on the screen 17 of the X-ray intensifying tube 3 can be filmed by the movie camera 20 as their luminosity is now strong enough to expose the moving film 21 in a frame time, in spite of the use of the very small amount of X-ray energy. The movie camera is driven with the synchronous motor 23 at 15–30 frames/second according to speed of motion of the examined organs. The shutter 22 in the camera has opening angle giving exposure time from $1/15$–$1/30$ of a second, and is driven by motor 23 in a fixed time relation with the intermittent mechanism 24. The pull-down of the film 21 occurs when the shutter is closed. The 15 frames/sec. recording can be projected by a standard movie projector at 16 frames/second without impairment of quality of the motion picture.

The X-ray intensifying tube 3 and motion picture camera 20 are enclosed in a lightproof box 26 in a fixed position so that no adjustment of focus is necessary. The lens system 25 in this form of invention is of conventional type and does not have to be described in detail. In order to have visual control over part of the examined body, fluoroscopic screen 27 is provided on which the examiner can check-up positioning before recording.

In this way X-ray motion pictures can be produced without the use of the excessive amount of X-ray energy and with the complete safety for the patient, which was the main objective of my invention. It is also obvious that multi-million volt expensive X-ray equipment will not be necessary any more for industrial X-ray moving pictures, which was another purpose of my invention.

Furthermore the grain of photographic film emulsion can be reduced without necessity of prolongation of the time of the exposure which will result in pictures of much better detail and which is another purpose of my invention.

An alternate form of this invention is represented in Fig. 2. In some cases it is preferable not to use the full intensification possible with the X-ray image intensifying tube 3a. It is important then to utilize fully the light of the fluorescent X-ray image 28 on the screen 27 of the X-ray intensifying tube. It is well known that the conventional lens system causes 95% loss of the light. In order to prevent this loss I am using reflective optical system 29 which in this embodiment consists of correcting lens in form of meniscus 30, of plane mirror and of concave 32 spherical mirror 31. The meniscus lens 30 is disposed distally to the center of the curvature of the concave spherical mirror 31 between the X-ray image intensifying tube 3a and the plane mirror 32. The plane mirror 32 is disposed between the concave spherical mirror 31 and its nearest conjugate focus 31a. The moving film 33 is disposed outside of the axis of the optical system in order not to obstruct the light. The fluorescent screen 27 of the X-ray image intensifying tube preferably should be slightly concave in order to avoid spherical aberration. The X-ray images produced by this optical system will be diminished in size. It is obvious that reflective optical system may have many forms and varieties and such as Schmitt system or "solid" system may be used in my invention. It is understood therefore that my invention is not limited to any particular form of the optical system.

The fluorescent X-ray moving images 28 from the fluorescent screen 27 are reflected by the concave aluminized mirror 31 onto plane mirror 32 and therefrom onto moving film 33. The moving film must have curved surface in order to avoid optical distortion. The shutter disc 34 controls the number of frames of motion picture. The shutter is driven by motor 35 in a fixed time relation with the intermittent mechanism 36. The intermittent mechanism is also driven by the synchronous motor 35 through the suitable gear drive. This optical system allows utilization of 15–20% of available light and represents considerable improvement in operation of the device. All parts of this device are enclosed in the lightproof box 77. Another variety on this invention is shown in Fig. 3. In this embodiment of the invention the invisible X-ray motion picture is converted into fluorescent X-ray picture in the fluoroscopic screen before its intensification and only then is projected by the reflecting optical system onto X-ray image intensifying tube for intensification necessary for filming.

Referring now to Figure 3 there is shown X-ray source 37, the examined body 38, the fluoroscopic screen 39, the fluorescent X-ray image 40, the optical system 41 and the X-ray image intensifying tube 48. The X-rays after the passage through the examined body form an invisible X-ray image which is converted in the fluoroscopic screen 39 into fluorescent X-ray image 40. The fluorescent image is projected by the reflective optical system 41 on the photocathode 42 of the X-ray image intensifying tube 48. The optical system 41 in this form of invention must have the greatest possible speed as the fluorescent X-ray image 40 is of a very weak luminosity. The reflective optical system of Schmitt may be used for this purpose, but requires precise workmanship, as the aspheric correcting plate is of a shape which is described mathematically as a curve of the fourth degree. Such a plate cannot be produced by machine with precision necessary for high speed and good resolution. Therefore I am making the use in this invention of the optical system belonging to the family of so-called "wide field fast cameras" described by L. G. Henyey and Jesse L. Greenstein in OSRD report No. 4505 which optical system can be manufactured in quantity with necessary precision. This optical system does not require aspherical correction plate and consists essentially of meniscus lens and of the concave spherical mirror. All optical surfaces have a common center of curvature located at diaphragm which limits the entering light rays. I modified this optical system for purposes of my invention by using in addition a plane or convex spherical mirror located between the reflecting surface of the concave spherical mirror and its nearest conjugate focus. The operation of this optical system is shown in Fig. 3. The fluorescent X-ray image is produced by invisible X-ray image on the fluoroscopic screen 39 which has curved surface in order to eliminate spherical aberration. The fluorescent light rays pass through the meniscus lens 43 and are reflected by aluminized concave spherical mirror 44 having an aperture 45 in the center thereof on the plane mirror 46 placed in the focal plane of the concave mirror. They are reflected from the plane mirror on the photocathode 42 of the X-ray image intensifying tube 48 which is disposed opposite the reflecting surface of the concave mirror and in the axis of its aperture. The fluoroscopic screen 39, the optical system 41 and X-ray image intensifying tube 48 are enclosed in light-proof box 47 in fixed position to each other in order to avoid need for focusing at each examination. In case of maladjustment focusing can be accomplished by means of lockscrew mechanism and micrometer adjustment screw 32 which shifts the lens 43 along the optical axis. For proper positioning of the box 47 in relation to the examined part of the body serves separate fluoroscopic screen 39a attached outside of the box 47. The fluorescent X-ray image produces in the photoemissive photocathode 42 photoelectron image. The photoelectron image obtained from the photoemissive layer 42 such as of caesium silver oxide or caesium on antimony, is projected on the first composite screen 49 of the amplifying section 50 having one or a few successively arranged amplifying screens 49 and 49a, by means of focusing magnetic or electro-magnetic fields which are not indicated since they are well known in the art and would serve only to complicate the illustrations. The amplifying composite screen 49 and 49a consist of electron pervious light reflecting layer 51 of electron fluorescent layer 52, of light transparent barrier layer 53 and of photoemissive layer 54. Fluorescent substances which may be used for amplifying screen 49 and 49a are zinc silicates, zinc sulphide, barium sulphate or calcium tungstate with or without activators. The satisfactory photoemissive materials will be caesium oxide activated by silver, caesium with antimony or with bismuth, or antimony with lithium or potassium. The barrier layer 53 between the fluorescent and photoemissive surfaces can be an exceedingly thin transparent film of mica, $ZnF_2$ or $ZnS$, silicon or of a suitable plastic. The electrons emerging from the amplifying screen 49 are electron-optically diminished and focused by means of magnetic or electro-magnetic fields 55 on the next amplifying screen 49a. The electron images from the amplifying section 50 are focused by magnetic or electro-magnetic fields 55a and are projected on the target 56 where they are intensified by secondary emission and are stored. The secondary electron image is diminished electron-optically by magnetic or electro-magnetic lenses 57 and is focused on the fluorescent screen 58 producing intensified fluorescent image having the pattern of the original X-ray image.

The intensified fluorescent images 58 appearing on the screen 58a of the X-ray intensifying tube 48 can be filmed by the movie camera 59 as their luminosity is now strong enough to expose the film 60 in a frame time, in spite of the use of the very small amount of X-ray energy. The movie camera is driven with the synchronous motor 23 at 15 to 30 frames/second according to the speed of motion of examined organs. The shutter 61 in the camera has opening giving exposure time from $1/15$ to $1/30$ of a second.

In this way X-ray motion pictures can be produced without the use of excessive amount of X-ray energy and with complete safety for the patient which was the main objective of my invention.

A more compact arrangement of this invention is shown in the Fig. 4. The optical system 62 consists here of aspherical correction plate 62a, concave spherical mirror 62b and of plane mirror 63. The plane mirror 63 is placed at an angle between the reflective surface of the concave mirror 62b and its nearest conjugate focus. The X-ray intensifying tube 48 is positioned outside of the axis of the optical system 62 so that it does not obstruct the path of the fluorescent rays from the fluoroscopic screen 64 through the optical system.

Another reflective optical system having still greater speed for producing X-ray image picture is shown in the Figure 5. The fluorescent light rays from the curved fluoroscopic screen 65 pass through doublet lens 66 and are reflected back by the concave spherical mirror 67. The reflected rays pass again through the doublet lens 66 and are focused on the plane mirror 78, positioned at an angle to the optical axis of the system. The plane mirror 78 reflects fluorescent light rays on the photocathode 68 of the X-ray image intensifying tube 69 placed outside of the optical system in order not to obstruct the path of light through the optical system. The photocathode 68 must have a curved surface corresponding to the curvature of the focal plane of the concave spherical mirror 67. This optical system has an exceptional speed and contributes considerably to improvement of sensitivity of X-ray motion picture camera. The fluoroscopic screen, the optical system and the X-ray image intensifying tube are enclosed in light-proof box 70 in fixed position to each other to avoid need for focusing at each examination. The remaining components of X-ray moving picture recording device such as motion picture camera, intermittent mechanism shutter and synchronous motor are the same as described above, and shown in Fig. 3. Further improvements in sensitivity of the X-ray movie camera is shown in Figure 6. In this variety of invention the photocathode 71 of the X-ray intensifying tube 72 is positioned in the focal plane of the concave spherical mirror 73 while the remaining part of said X-ray image intensifying tube is on the opposite side of the reflecting surface of said concave spherical mirror. The fluorescent rays from the fluoroscopic screen 74 pass through meniscus lens 75 and are focused by the concave spherical mirror 73 on the photocathode 71. This optical arrangement allows the use of solid photocathode instead of translucent photocathode and results in gain of photoelectron output by factor of 2. This is equivalent to the same gain in sensitivity of X-ray motion picture camera and represents considerable improvement over other X-ray moving picture cameras. The remaining components of X-ray moving picture camera are the same as described above and illustrated in Fig. 3.

In some instances it is advantageous to produce an enlarged X-ray fluorescent image in the photocathode of the X-ray image tube. In such a case, see Fig. 7, the fluoroscopic screen 80 is disposed between the reflecting surface of the concave mirror 81 and the aberration correcting element 82. The reflective optical system produces enlarged image 84 of the fluorescent image 83 in the fluoroscopic screen 80. This enlarged image is reflected by the X-ray transparent plane mirror 85 on the X-ray image tube 86. The optical system used for the enlargement of the X-ray image may have many forms and modification, only some of which have been illustrated above and it is to be understood that many changes may be made without departing from the spirit and scope of the invention. The X-ray image tube 86 used in this modification of my invention has a very large photocathode 87, which is of size sufficient to respond to the enlarged X-ray image 84. The photoelectron image produced by the projection of the X-ray fluorescent image on the photocathode 87 is electronoptically diminished by magnetic, electrostatic, or electromagnetic fields 88, which are not indicated in details as they are well known in the art, and is projetced on the first composite screen 89 of the amplifying section 90. By electronoptical demagnification of the previously enlarged X-ray image I obtained much better intensification of said X-ray image than with previously described methods, because electronic intensification is proportional to the linear square of diminution. The remaining parts of the X-ray image tube 86, as well as the motion picture camera are the same as described above.

Figure 8:
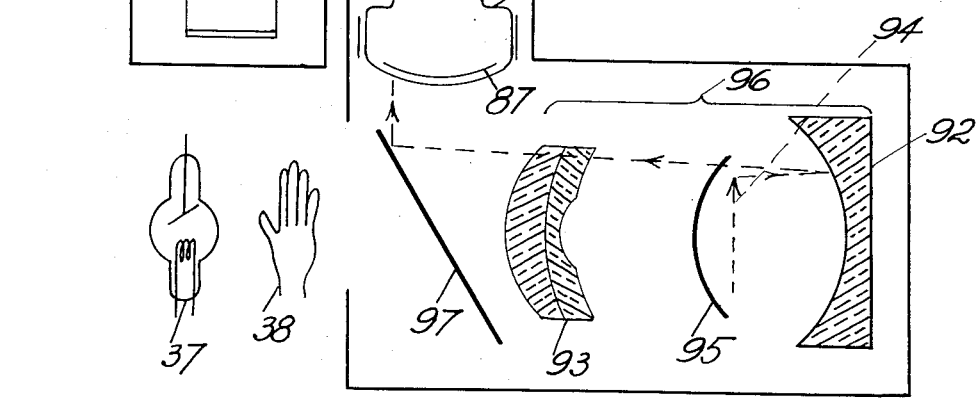
Fig. 8 represents modification of the optical system used in combination with X-ray image tube responsive to an enlarged X-ray image.

Another optical system for projection of an enlarged X-ray image is illustrated in the Fig. 8. The optical system 96 in this case consists of reflecting concave mirror 92 and of meniscus lens 93. The fluorescent X-ray image 94 is produced in the fluorescent screen 95 which is positioned between the concave mirror and the meniscus lens. The fluorescent X-ray image 94 is projected by the optical system 96 in enlarged form on the X-ray transparent plane mirror 97 and is reflected therefrom on the X-ray image tube 86 described above. It will be understood that still X-ray pictures may be produced by my invention in a similar manner as described herein before for taking motion pictures. The motion pictures camera will be in such a case replaced by a still pictures camera.

Although the preferred embodiments of the invention have been described it will be obviouus to those skilled in the art that various changes and modifications may be made without departing from the true spirit and scope of this invention.

What is claimed is:

1. A system for X-ray cinematography comprising, in combination, an X-ray source for producing an X-ray image, an X-ray fluorescent screen for receiving said image and converting said image into a fluorescent image, a reflective optical system for focusing said fluorescent image, an image sensitive tube containing a photocathode for receiving said focused image and converting said image into the first electron beam having the pattern of said image, a composite screen consisting of a light reflecting layer transmitting said electron beam from said photocathode, a fluorescent layer adjacent said light reflecting layer for converting said electrons into a light image, a light transparent separating layer independent of walls of said tube, and a photoemissive layer receiving light from said fluorescent layer through said separating layer and emitting in response to said light the second electron beam having the pattern of said first electron beam, and a fluorescent screen disposed in said tube, provided with an electron transparent light reflecting backing, for receiving said second electron beam and converting said electron beam into a visible image, and recording means for said visible image.

2. In a device, as defined in claim 1, said optical system consisting of a meniscus lens, of a light reflecting concave mirror and of a light reflecting plane element.

3. In a device, as defined in claim 1, said optical system consisting of a meniscus lens and of a concave light reflecting element having a window in its center.

4. In a device, as defined in claim 1, said optical system consisting of a meniscus lens, of a concave spherical mirror having a window in the center thereof, and of a light reflecting plane element.

5. A system for X-ray cinematography comprising, in combination, an X-ray source for producing an X-ray image, an X-ray fluorescent screen for receiving said image and converting said image into a fluorescent image, a reflective optical system for focusing said fluorescent image, and an image sensitive tube containing a photocathode for receiving said focused image and converting said image into the first electron beam having the pattern of said image, a composite screen consisting of a light reflecting layer transmitting said electron beam from said photocathode, a fluorescent layer adjacent said light reflecting layer for converting said electrons into a light image, a light transparent separating layer independent of the walls of said tube, and of a photoemissive layer receiving light from said fluorescent layer through said separating layer and emitting in response to said light the second electron beam having the pattern of said first electron beam, and a fluorescent screen disposed in said tube provided with an electron transparent light reflecting backing, for receiving said second electron beam and converting said electron beam into a visible image.

EDWARD EMANUEL SHELDON.

REFERENCES CITED

The following references are of record in the file of this patent:

UNITED STATES PATENTS

| Number | Name | Date |
|---|---|---|
| 2,158,853 | Coolidge | May 16, 1939 |
| 2,166,102 | Wild | July 18, 1939 |
| 2,198,479 | Langmuir | Apr. 23, 1940 |
| 2,258,436 | Von Ardenne | Oct. 7, 1941 |
| 2,297,478 | Kallmann | Sept. 29, 1942 |
| 2,344,042 | Kallmann et al. | Mar. 14, 1944 |

OTHER REFERENCES

An Infra Red Image Tube and Its Military Applications, by G. A. Morton and L. E. Flory, R. C. A. Review, September 1946, pp. 325–413.